(12) United States Patent
Barclay et al.

(10) Patent No.: US 9,112,777 B1
(45) Date of Patent: Aug. 18, 2015

(54) TAG-BASED RESOURCE CONFIGURATION CONTROL

(71) Applicant: Amazon Technologies, Inc., Reno, NV (US)

(72) Inventors: Christopher B. Barclay, Seattle, WA (US); Nicholas Alexander Allen, Seattle, WA (US); William T. Shelton, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 285 days.

(21) Appl. No.: 13/633,555

(22) Filed: Oct. 2, 2012

(51) Int. Cl.
*H04L 12/24* (2006.01)

(52) U.S. Cl.
CPC ........ *H04L 41/0803* (2013.01); *H04L 41/0869* (2013.01)

(58) Field of Classification Search
CPC .......................... G06F 2221/2113; G06F 21/62
USPC ......................................................... 709/226
See application file for complete search history.

(56) References Cited

U.S. PATENT DOCUMENTS

| | | | |
|---|---|---|---|
| 2012/0260303 A1* | 10/2012 | Wollnik et al. | 726/1 |
| 2013/0018920 A1* | 1/2013 | Griffin | 707/783 |
| 2013/0160072 A1* | 6/2013 | Reus et al. | 726/1 |

* cited by examiner

*Primary Examiner* — Lance L Barry
(74) *Attorney, Agent, or Firm* — Lee & Hayes, PLLC

(57) ABSTRACT

In a system that provides network-based infrastructure services, customer resources are tagged in accordance with policies provided by the customers. Resources may be automatically tagged upon creation based on the provided policies. In addition, existing resources may be analyzed and automatically tagged to indicate characteristics of the resources that may be of interest to the customer. The customers may also specify configuration policies in terms of resource tags, and the system may be configured to apply and/or enforce the configuration policies.

28 Claims, 4 Drawing Sheets

TAG-BASED RESOURCE CONFIGURATION CONTROL

BACKGROUND

Large-scale, network-based computing represents a paradigm shift from traditional client-server computing relationships. With large-scale, network-based service platforms (e.g., data centers), customers are able to leverage shared resources on demand by renting resources that are owned by third parties and that reside "in the cloud." With these resources, users of the platform are able to launch and maintain large applications without actually owning or servicing the underlying infrastructure necessary for these applications. As a result, network-based service platforms have expanded the class of individuals and companies able to effectively compete in the realm of computing applications.

The number of users of network-based service platforms has increased rapidly. Furthermore, these users are using a greater number of resources and a wider variety of resource types than ever before. As a consequence of this growth, user management of these resources has become a significant challenge.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques for managing resources that are implemented in conjunction with online or network-accessible services such as offered by large-scale computer infrastructure providers. Such resources may include physical and/or virtual computers and servers, data storage, processors, functional units, services, etc. Each resource may be associated with one or more tag/value pairs, which may also be referred to simply as tags.

Customers of a computer infrastructure provider may utilize graphical or programmatic interfaces to specify tags for individual resources. In accordance with certain embodiments, a customer may configure policies for automatically associating tags with resources as the resources are created. Tags for particular resources may be automatically created based on various criteria, such as the identities of users creating the resources, tools or equipment used in creating the resources, characteristics of the resources themselves, and other conditions.

In some implementations, the computer infrastructure provider may independently create resource tags, which may subsequently be used by customers for resource management. For example, the computer infrastructure provider may automatically tag resources that have not been used for a certain period of time. As another example, the computer infrastructure provider may analyze sets of resources used by the customer and may associate tags with the resources based on such an analysis.

In some implementations, tags may be associated with computed or dynamic values, based on logical expressions or conditions provided by the customer. Such logical expressions may rely on other tags or on other identifiable characteristics of the resources, which may change over time.

Customers may also specify or configure policies for acceptable resource configurations, and such configuration policies may be enforced by the computer infrastructure based on examining the resource tags. Configuration policies may be specified in terms of resource tags, and customer requests regarding resources may be conditioned upon compliance with such policies. Requests by customers regarding particular resources may be accepted, rejected, or modified based on configuration policies and upon examination of tags associated with the resources. In addition, certain operations may be automatically performed with respect to resources, based on the provided configuration policies.

Figure 1:
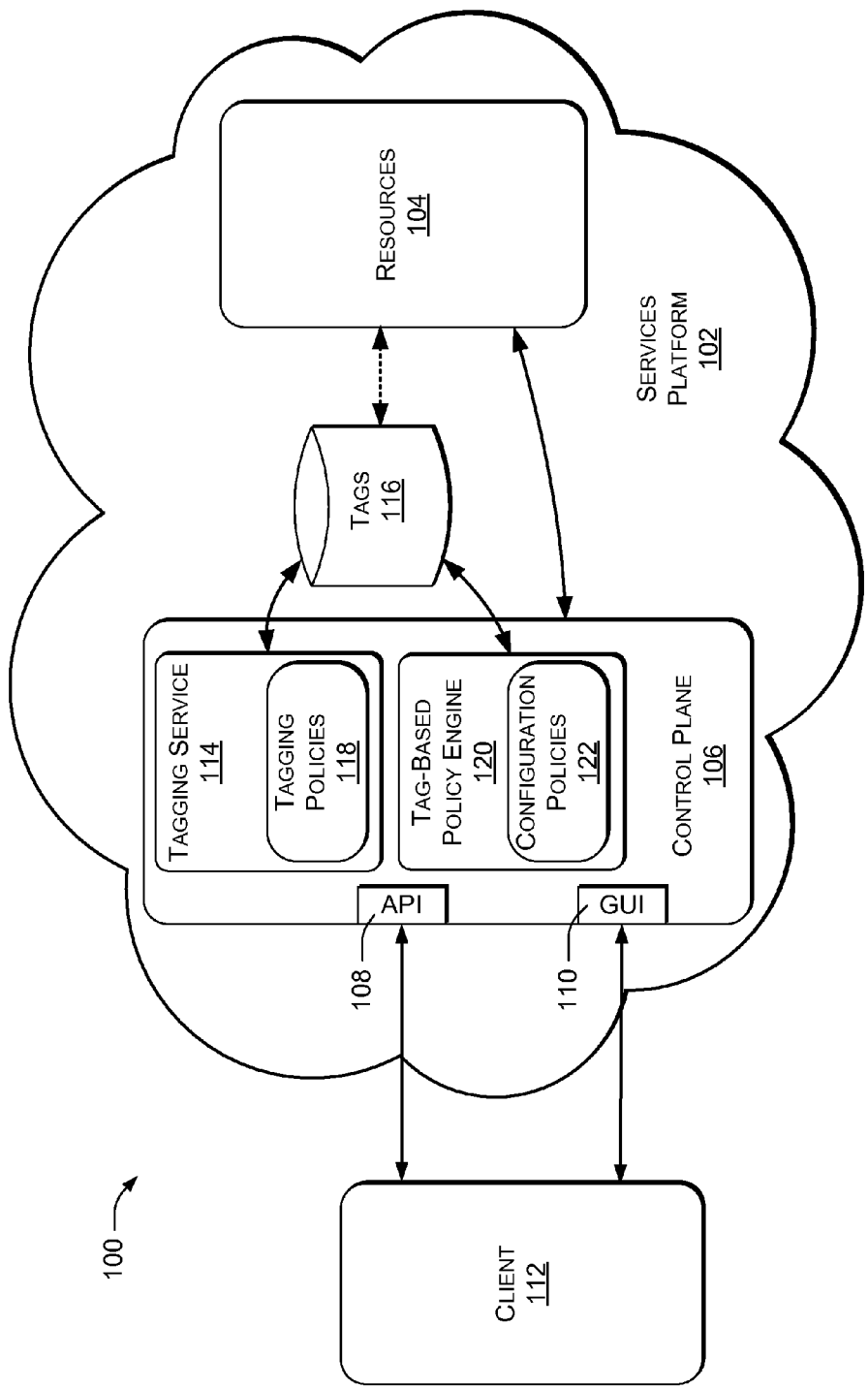
FIG. 1 is a block diagram illustrating an example online services environment in which descriptive tags may be associated with resources.

FIG. 1 illustrates an environment 100 for creating, using, and managing resources in accordance with these techniques. The environment of FIG. 1 includes a network-based infrastructure provider or online services platform 102, which may provide a wide variety of computing resources 104. The network-based services platform 102 may be referred to as Infrastructure as a Service (IaaS) and/or Platform as a Service (PaaS). Resources supported or provided by the network-based services platform 102 may include dedicated servers, shared servers, virtual servers, server slices, processors, processor cycles, storage, memory, and so forth. In some cases, the resources 104 may be available in scalable increments or amounts, which can be dynamically increased or decreased in response to usage and/or demand. Service fees may be tied to the amount of the resources 104 that are actually used.

The resources provided and supported by the services platform 102 may also include functional elements or services. Functional elements or services may comprise applications or sub-applications that are used as building blocks for customer or developer applications. For example, the services platform 102 may provide predefined database functionality in the form of a discrete service that can be instantiated on behalf of a customer. Functional components may relate to network communications and other services or activities. Network-related services may, for example, include firewalls, load balancers, filters, routers, and so forth. Additional functional components may be available for such things as graphics processing, language translation, searching, etc.

The various services and functionality provided by the services platform 102 may be exposed to customers through various forms of network-based interfaces, which in FIG. 1 are represented as being implemented by a control plane 106. The control plane 106 may expose application programming interfaces (APIs) 108 that can be programmatically accessed by remote or external devices and users to establish and configure many of the services and functionality provided by the services platform 102. The APIs 108 may be designed to support various client functions and communications, and may be accessible through local-area or wide-area networks, including the Internet. The control plane 106 may also, or alternatively, expose a graphical user interface (GUI) 110 for interactive access by users or customers of the services platform 102. For example, the GUI 110 may comprise an Internet-based web server or hypertext-markup-language (HTML) server, which may in turn implement a network-accessible website.

Customers may communicate with the services platform 102 from a client 112, such as a computer, a mobile device, or other equipment. In some cases, the client 112 may interact programmatically with the APIs 108 of the control plane 106. For example, the client 112 may execute one or more programs that issue network-based API calls to the control plane 106 specifying desired actions or queries to be implemented by the services platform 102. In other cases, the client 112 may implement a graphical browser, such as an Internet browser, through which a user may access the services of the services platform 102. More specifically, such a browser may communicate with the GUI 110 of the control plane 106 in response to interactive instructions, selections, and data entry by the user.

The control plane 106 may implement or provide a resource tagging service 114 that automatically generates and maintains resource tags corresponding to individual computing resources, based on automatic tagging policies supplied or specified by customers. Generally, a tag may comprise any sort of identifier that is associated with one of the resources 104. In the described embodiment, a tag may comprise a tag name and an associated tag value in a form that can be represented as name:value. As an example, a particular resource might be assigned a tag value pair such as "ResourceType: UserManagement" to a particular resource, indicating that the resource is of the type "User Management".

In practice, each of the tags 116 may comprise three data fields: a name, a value, and a resource identifier (ID) that associates the name and value with a particular resource. The value may be a static value or a dynamically calculated value. A dynamically calculated value is a value that is recalculated whenever it is reported or queried, based on a specified logical condition or expression.

In some cases, tags 116 may be created and assigned to respective resources through the control plane 106, such as by explicitly specifying tags through calls to the APIs 108 or interactions with the GUI 110. In accordance with certain embodiments, however, the customer may also specify or provide more general tagging policies 118 to the services platform 102 through the APIs 108 or GUI 110 of the control plane 106. The tagging policies 118 may specify tags that are to be applied or assigned automatically by the services platform 102 to resources that meet certain criteria or satisfy certain conditions. As an example, a particular policy may indicate that resource tags are to be automatically generated and assigned to certain resources depending on which of multiple users creates the resources, which of multiple different tools or systems are used to create the resources, or on other criteria relating to creation of the resources.

Figure 2:
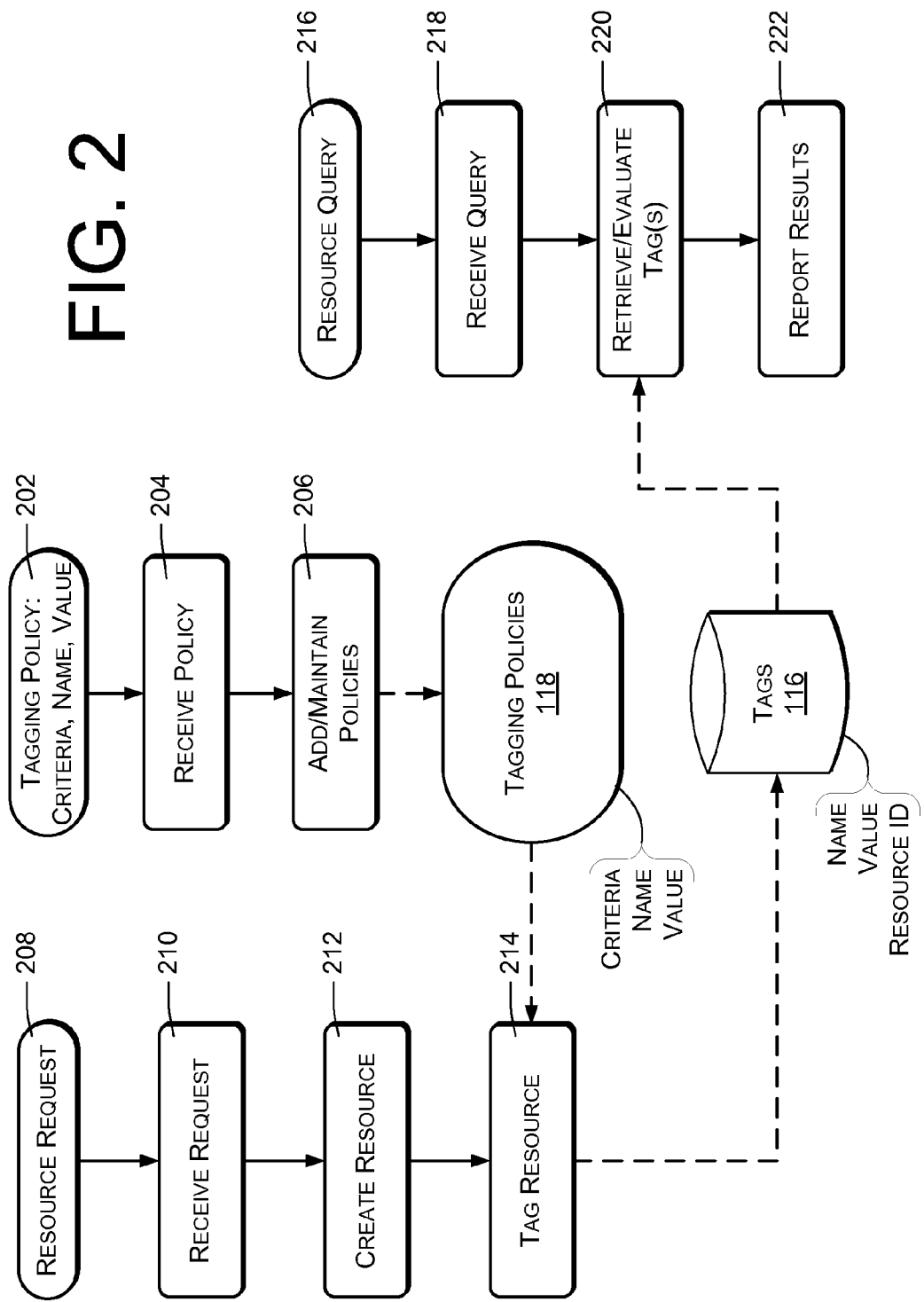
FIG. 2 is a flow diagram illustrating example processes involved in associating descriptive tags with online resources.

FIG. 2 illustrates example methods that may be performed by or in conjunction with the services platform 102 to manage the association of tags with resources in the environment of FIG. 1.

A customer may create or specify an automatic tagging policy 202, which may indicate a tag and one or more criteria or conditions for assigning the tag. More specifically, a tagging policy may comprise one or more criteria, a tag name, and a tag value. The criteria may be specified with various levels of complexity, depending on implementation. In some cases, a criterion may comprise a single data item, which is understood to apply to a certain property of a resource. For example, a criterion may comprise a user name or user group, so that any resource created by the specified user or group will be assigned the indicated tag name and tag value. In other cases, a criterion may be specified as a logical expression that depends on a combination of resource properties or other conditions, including resource tags.

In some situations, the criteria of the tagging policy 202 may be omitted, and the tagging policy 202 may be understood to apply to all resources, with the value of the tag being a calculated value in accordance with a specified logical expression.

The tag name may comprise a text string such as a word or a combination of words. The tag name may also comprise some other type of code. In many situations, the tag name will be a descriptive title indicating the purpose or meaning of the tag. The tagging policy may in some implementations specify the tag name as a calculated expression that depends on a combination of resource properties or other conditions, including resource tags.

The tag value may comprise a text string, numeric value, or combination of the two. The tag value may in some cases be specified in a tagging policy as a static value or constant. In other cases, the tag value may be specified as a logical expression that depends on properties of the resource to which the tag is to be applied or on other system or ambient properties that are not necessarily directly related to the resource itself. For example, such a logical expression may be dependent upon existing resource tags of the resource itself or of other resources.

As another example, certain situations may arise in which a resource is created by another resource, which may be referred to as a parent resource. In situations such as this, a tagging policy may specify that a resource meeting specified criteria is to be automatically tagged with one or more of the resource tags that have previously been associated with the parent computing resource.

An action 204 may comprise receiving the tagging policy 202, which may have been submitted by the customer through the APIs 108 and/or the GUI 110 of the control plane 106.

An action 206 may comprise adding and maintaining the tagging policy 202 as part of the collective tagging policies 118, for future application to existing and newly created resources.

In an independent process shown at the left side of FIG. 2, a resource request 208 may be received by the services platform 102 in an action 210. The resource request 208 may specify the characteristics of a resource that is be by created for or on behalf of a customer. The resource request 208 may be created and supplied by the customer or by a programmatic entity (such as another customer resource) on behalf of the customer. In an action 212, the services platform 102 may respond to the resource request 208 by creating the requested resource. In an action 214, performed in conjunction with or in response to the action 212 of creating the resource, the services platform 102 may automatically tag the resource by creating a tag and storing the tag with the collective tags 116. As mentioned above, an individual tag may comprise a name, a value, and the identifier (ID) of the resource with which the tag is to be associated.

The action 214 of tagging a newly created resource may involve evaluating the criteria of each of the tagging policies 118 to determine which of multiple tagging policies are applicable to the newly created resource. In addition, the action 214 may involve evaluating a logical expression that is specified by a tagging policy in order to calculate a static value for an applicable tag. In some cases, the tagging policy may specify a dynamic tag value, comprising a logical expression that is to be evaluated upon reporting the tag or when the tag is a criterion of a customer query.

In another independent process shown at the right side of FIG. 2, the services platform 102 may receive a resource tag query 216 in an action 218. For example, a customer or other programmatic entity may submit the query 216 using the APIs 108 and/or the GUI 110. The query may indicate a resource, such as by specifying the ID of the resource. Alternatively, the query may specify criteria based on tags and tag values.

In response to the query, the services platform 102 may retrieve or evaluate the tags 116 that have been associated with the one or more resources implicated by the query 216. In response to the tags and tag values, the services platform 102 may report the results of the query in an action 222. When tag values are specified dynamically, as logical expressions, the action 220 may include evaluating the logical expressions to determine a calculated tag value for reporting in response to the query 216. When tag values are specified as constants, the action 220 may comprise simply retrieving or evaluating those constants.

Figure 3:
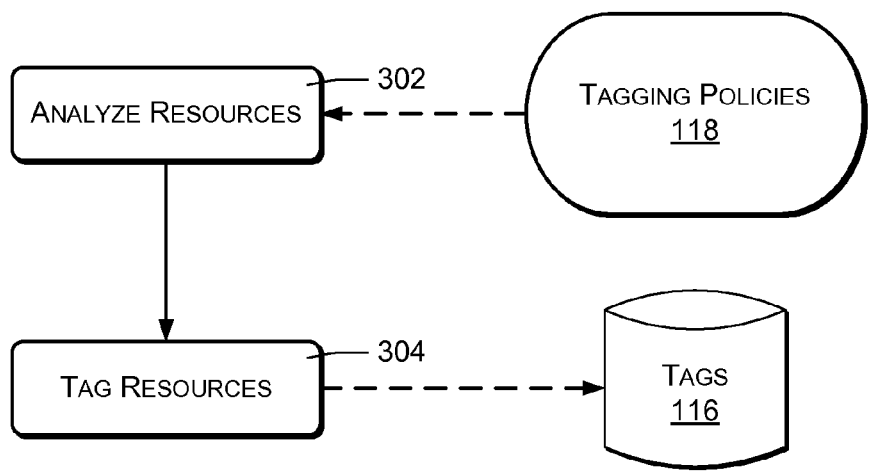
FIG. 3 is a flow diagram illustrating another example process that may be implemented in order to associate descriptive tags with online resources.

FIG. 3 illustrates an example of a process that may be performed in some embodiments to automatically assign tags to resources, such as in the environment of FIG. 1. In this example, the services platform may analyze and apply tags 116 to existing or previously created resources based on tagging policies 118. Furthermore, the tagging policies may include policies other than those specified by customers, such as policies created and applied by the services platform itself. The process of FIG. 3 may result in the automatic creation of various system-wide tags that may be referenced by customers for various purposes, to convey useful information about the customer's resources.

An action 302 may comprise analyzing the existing and/or previously created resources of a customer. The analysis 302 may identify various characteristics of resources, such as size, capacity, utilization, status, and so forth. The analysis may in some cases be based on statistical techniques, with the goal of identifying anomalies that the customer may find important. For example, the analysis may determine that only a small number of server instances have opened a particular communications port, which may indicate a problem with those server instances.

The analysis 302 may be based at least in part on the tagging policies 118, which may include tagging policies provided by the customer as well as tagging policies created by the services platform 102.

Based upon the analysis 302, an action 304 may comprise tagging the resources based on their determined characteristics. Such tags may comprise name-value pairs as described above. In certain embodiments, the tag names and values may be generated by the services platform 102, rather than by specific policies provided by the customer.

Returning to FIG. 1, the control plane 106 may implement or provide a tag-based policy engine 120 that automatically applies or enforces configuration policies 122 that have been supplied or configured by customers.

The configuration policies 122 may relate to allowable actions that may be performed with respect to various resources 104, or to operations that are to be performed automatically by the services platform 102 in response to various events. Generally, the actions available to a customer with respect to an individual resource may be classified as creation, modification, update, or deletion. Any one or more of these actions may be conditioned upon the existence or values of tags associated with the resource and/or with other resources. For example, a resource may be tagged as belonging to certain logical group of resources, and selected actions regarding resources in those groups may be limited to certain users or types of users by the configuration policies 122.

In addition, the configuration policies 122 may relate to time or time periods, such as may be the case where certain operations are allowed only at certain times of day. The configuration policies 122 may also specify that certain operations are allowed with respect to a resource only when certain conditions are met, as indicated by the tags of the resource or the tags of other resources.

The configuration policies 122 may alternatively, or additionally, relate to actions that are to be performed automatically by the services platform 102 upon the occurrence of certain events. More specifically, the configuration policies 122 may indicate that certain operations, such as restarts, backups, snapshots, and so forth are to be performed by the services platform based on tags or tag values associated with the resources. For example, the configuration policies 122 may indicate that image snapshots of resources having certain tags are to be taken by the services platform 102 at periodic intervals. The times at which the snapshots are to be taken may be specified by the policies 122 or by the resource tags.

The configuration policies 122 may also specify actions that are to be performed by the services platform 102 in response to certain resource-related events, such as resource failures. For example, the configuration policies 122 may specify that a resource having certain tags is to be restarted automatically upon any detected failure.

As another example, tags and configuration policies may be used in conjunction with each other to apply and/or enforce budget compliance. Thus, the configuration policies may indicate allowable costs for groups of resources, as defined by the tags of those resources. Upon exceeding allowable budgets, the configuration policies 122 may specify that the customer is to be notified. Alternatively, the configuration policies 122 may disallow the creation of any new resources that would cause budget violations, or may automatically start shutting down non-essential or low priority resources. Tags 116 may be used in this process, such to indicate priority of resources.

Figure 4:
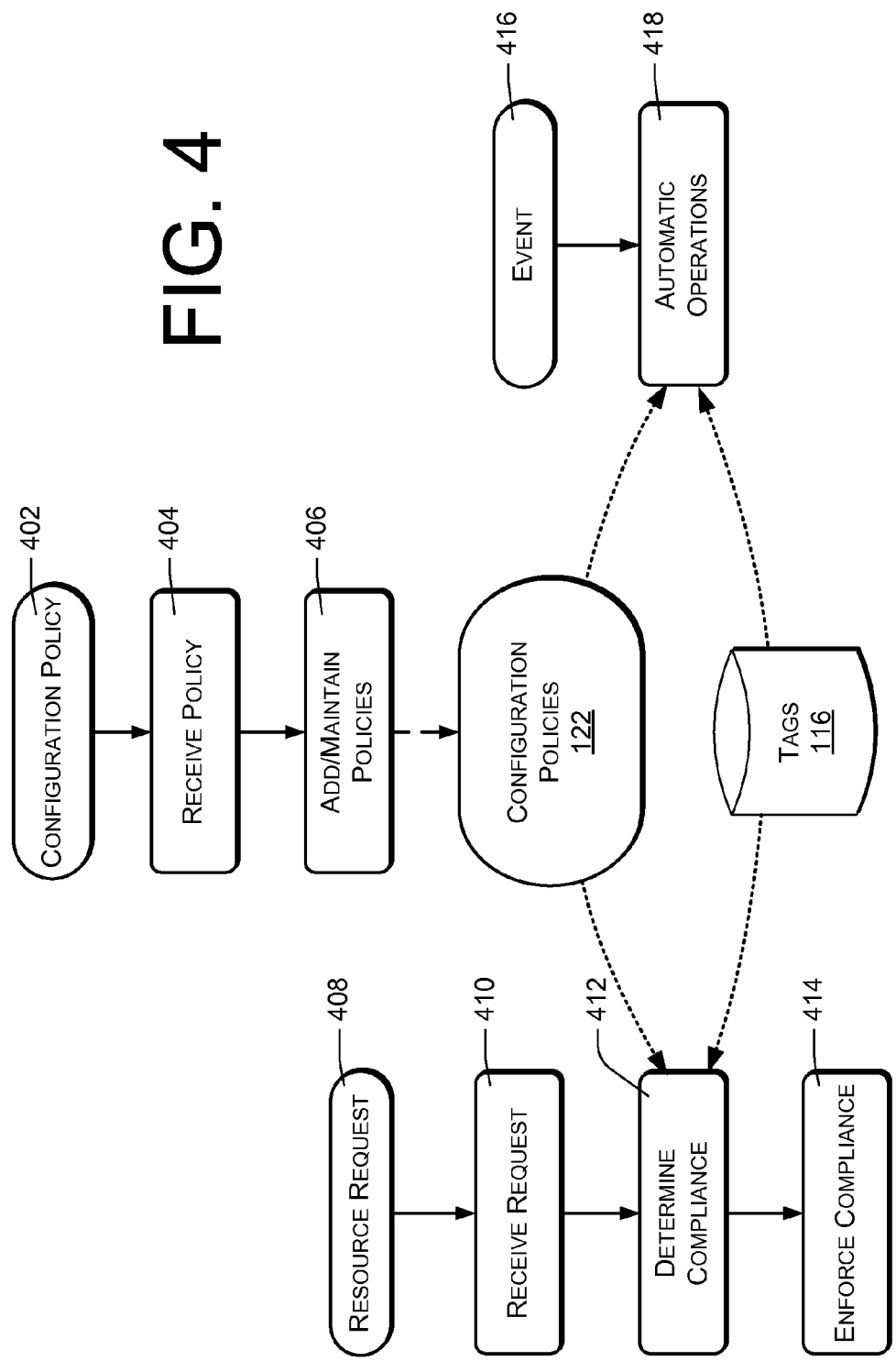
FIG. 4 is a flow diagram illustrating example processes involved in applying, monitoring and/or enforcing configuration policies based on resource tags.

FIG. 4 illustrates example methods that may be performed by or in conjunction with the services platform 102 to manage the configuration policies 122.

A customer may create or specify a configuration policy 402, which may indicate allowable properties or conditions of resources in terms of resource tags. The resources to which the policy 402 applies may be indicated by the specification of resource tags or tag values. The allowable properties or conditions of the resources may similarly be specified in terms of tags or tag values.

An action 404 may comprise receiving the configuration policy 402, which may have been submitted by the customer through the APIs 108 and/or the GUI 110 of the control plane 106.

An action 406 may comprise adding and maintaining the configuration policy 402 as part of the collective configuration policies 122, for future application to existing and newly created resources based on the tags 116 of those resources.

In an independent process shown at the left side of FIG. 4, a resource request or resource-related command 408 may be received by the services platform 102 in an action 410. The resource request 408 may specify some action that is to be implemented with respect to a particular resource or group of resources. The resource request 408 may be created and supplied by the customer or by a programmatic entity (such as another customer resource) on behalf of the customer.

An action 412 comprises determining compliance of the request, based on the configuration policies 122 and on the tags 116. More specifically, the action 412 comprises examining the resource tags 116 to determine compliance with the configuration policies 122.

An action 414 may comprise enforcing compliance with the configuration policies 122, based on the action 412. If the request is found to comply with the configuration policies 122, the request is accepted and performed. Otherwise, if the request does not comply with the configuration policies 122, the request may be rejected. Alternatively, the request may be modified so that it complies with the configuration policies 122. In either case, the action 414 may include notifying the customer of any non-compliance with the configuration policies 122. In some cases, the request may be accepted and implemented even when it causes a violation of the configuration policies, and the "enforcement" of action 414 may comprise simply notifying the customer of the violation.

In another independent process shown at the right side of FIG. 4, a tag-based operation may be performed in response to an event 416 other than an explicit request by the customer. For example, the event 416 may comprise expiration of a time period. As another example, the event 416 may comprise a resource event, such as failure of a resource. As yet another example, the event 416 may comprise a situation in which a set budget has been exceeded by usage of services platform resources.

In response to the event 416, the services platform may perform one or more automatic operations 418, based on the configuration policies 122 and the tags 116. For example, the automatic operations 418 may include operations such as machine backups, memory snapshots, restarting, creating, destroying modifying, updating, and so forth. The automatic operations 418 may be specified by the configuration policies, and may be dependent upon tags 116 of the resources. For example, the automatic operations may be performed in accordance with parameters specified by the tags 116 of individual resources 116, or may be applied only to those resources having certain tags or tag values.

Note that although the various functions described above have been attributed largely to the services platform 102, the described functionality may be allocated in different ways. Thus, in some embodiments the client 112 may perform functions that are described above as being implemented by the services platform 102. Similarly, the services platform 102 may perform functions that are described above as being implemented by the client 112. Furthermore, certain implementations may include additional elements or actors that perform some of the described actions.

The system described above provides a flexible way of managing resources based on tags. Such tags may be created or assigned based on customer-supplied policies. In addition, customers may specify configuration policies in terms of tags, allowing the customers to enforce arbitrary policies without further support by the services platform 102.

Figure 5:
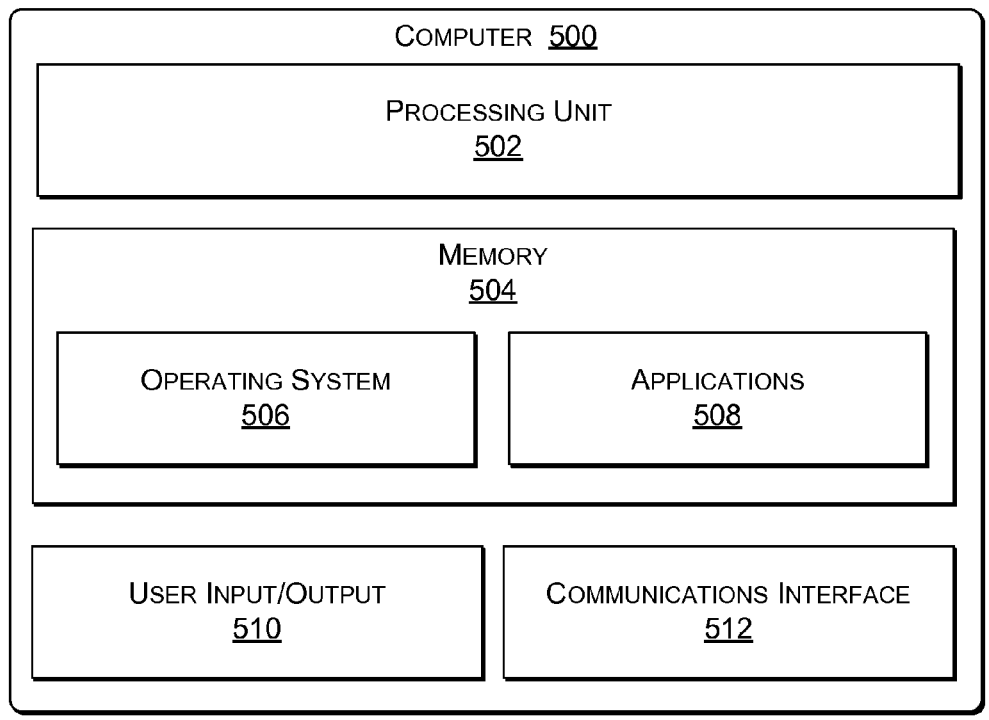
FIG. 5 is a block diagram showing high-level components of an example computer that may be used in conjunction with the systems and techniques described herein.

FIG. 5 shows relevant components of an example computer 500 that may be used to implement physical servers of the services platform 102 and/or to implement the client 112. The physical servers of the services platform 102 and the client 112 may of course be implemented in many different ways. Note that the client 112 comprise any number of various devices that may be used to access network-based services, such as desktop computers, notebook computers, tablet computers, terminals, personal digital assistants (PDAs), smartphones, gaming devices, entertainment devices, industrial controllers, and so forth.

The example computer 500 may comprise one or more processing units 502 and one or more forms of computer-readable memory 504. The memory 504 may comprise volatile and nonvolatile memory. Thus, the memory 504 may include, but is not limited to, RAM, ROM, EEPROM, flash memory, or other memory technology, or any other medium which can be used to store applications and data. The memory 504 may also include removable media such as optical disks, portable devices/drives, and so forth.

The memory 504 may be used to store any number of functional components, such as programs and program modules that are executable on the processing unit 502. For example, the memory may store an operating system 506 and various applications or user-specified programs 508. The operating system 506 and/or the user-specified programs 508 may include components, modules, and/or logic for performing the actions described herein. More specifically, executable components stored in the memory 504 may comprise computer-executable instructions that, when executed, cause the one or more processing units 502 to perform acts and to implement techniques described herein.

The computer 500 may also have user input/output components 510, such as a display, keyboard, mouse, etc. The computer 500 may also comprise a communications interface 512 such as a network interface.

Generally, the functionality described herein may be implemented by one or more computers such as shown by FIG. 5 or by similar devices, with the various actions described above distributed in various ways across the different computers. Computers of the services platform 102 may be located together or separately, and organized as virtual servers, server banks, and/or server farms. The described functionality may be provided by the computers of a single entity or enterprise, or may utilize the computers and/or services of multiple entities or enterprises.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, when executed, cause one or more processors to perform acts comprising:
   operating a plurality of computing resources on behalf of a customer;
   receiving a tagging policy from the customer, wherein the tagging policy specifies resource tags for association with the computing resources;
   automatically tagging the computing resources with individual ones of the resource tags based at least in part on the tagging policy;
   maintaining the resource tags corresponding to individual ones of the computing resources;
   receiving a configuration policy from the customer, wherein the configuration policy specifies a policy regarding configuration of the computing resources at least in part in terms of the resource tags;
   examining the resource tags to determine compliance with the configuration policy; and
   enforcing compliance with the configuration policy based at least in part on the examining.

2. The one or more non-transitory computer-readable media of claim 1, wherein the enforcing comprises one or more of the following:
   notifying the customer regarding non-compliance of the computing resources with the configuration policy;
   automatically performing operations with respect to certain of the computing resources based at least in part on the resource tags of the computing resources;
   disallowing particular configuration requests based at least in part on the examining; or
   modifying particular configuration requests based at least in part on the examining.

3. The one or more non-transitory computer-readable media of claim 1, the acts further comprising creating a particular computing resource, wherein the automatically tagging is performed upon creating the particular computing resource.

4. The one or more non-transitory computer-readable media of claim 1, the acts further comprising:
   analyzing the computing resources to determine characteristics of the computing resources; and
   wherein the automatically tagging comprises tagging the computing resources with generated resource tags based at least in part on the determined characteristics of the computing resources.

5. An infrastructure service, comprising:
   one or more processors; and
   memory storing computer-executable instructions that, upon execution by the one or more processors, provide:
      a plurality of computing resources that are operated on behalf of a customer;
      a resource tagging service to automatically generate resource tags for the computing resources;
      the resource tagging service being configured to maintain the resource tags corresponding to individual ones of the computing resources; and
      a tag-based policy engine configured to apply configuration policies based at least in part on the resource tags.

6. The infrastructure service of claim 5, wherein the configuration policies are configured by the customer.

7. The infrastructure service of claim 5, wherein applying the configuration policies comprises examining the resource tags.

8. The infrastructure service of claim 5, wherein applying the configuration policies comprises notifying the customer regarding non-compliance of the computing resources with the configuration policies.

9. The infrastructure service of claim 5, wherein the configuration policies specify operations that are to be performed with respect to certain of the computing resources based at least in part on the resource tags of the computing resources.

10. The infrastructure service of claim 5, wherein applying the configuration policies comprises disallowing particular configuration requests based at least in part on the configuration policies and the resource tags.

11. The infrastructure service of claim 5, wherein applying the configuration policies comprises modifying particular configuration requests based at least in part on the configuration policies and the resource tags.

12. The infrastructure service of claim 5, wherein the resource tagging service is configured to automatically generate the resource tags based on automatic tagging policies specified by the customer.

13. The infrastructure service of claim 5, wherein the resource tagging service is configured to automatically generate the resource tags depending on which of multiple users creates the computing resources.

14. The infrastructure service of claim 5, wherein a particular computing resource is created by a parent computing resource, and wherein automatically generating the resource tags comprises tagging the particular computing resource with one or more resource tags associated with the parent computing resource.

15. The infrastructure service of claim 5, wherein automatically generating the resource tags comprises:
   analyzing the computing resources to determine characteristics of the computing resources; and
   tagging the computing resources based at least in part on the determined characteristics of the computing resources.

16. The infrastructure service of claim 5, wherein the resource tagging service is configured to automatically generate the resource tags based at least in part on logical conditions specified by the customer.

17. The infrastructure service of claim 5, wherein the resource tagging service is configured to automatically generate the resource tags upon creation of individual computing resources based at least in part on logical conditions specified by the customer.

18. The infrastructure service of claim 5, wherein the resource tagging service is further configured to evaluate the resource tags upon reporting the resource tags to the customer, based at least in part upon logical conditions specified by the customer.

19. A method comprising:
   operating a plurality of computing resources on behalf of a customer;
   automatically generating resource tags for the computing resources;
   maintaining the resource tags corresponding to individual ones of the computing resources;
   receiving a configuration policy from the customer, wherein the configuration policy specifies a policy regarding configuration of the computing resources; and examining the resource tags to determine compliance with the configuration policy.

20. The method of claim 19, further comprising enforcing compliance with the configuration policy based at least in part on the examining.

21. The method of claim 19, further comprising notifying the customer regarding non-compliance of the computing resources with the configuration policy.

22. The method of claim 19, further comprising automatically performing operations with respect to certain of the computing resources based at least in part on the examining.

23. The method of claim 19, further comprising disallowing particular configuration requests based at least in part on the examining.

24. The method of claim 19, further comprising modifying particular configuration requests based at least in part on the examining.

25. The method of claim 19, wherein automatically generating the resource tags is based at least on part on one or more existing tags of the computing resources.

26. The method of claim 19, wherein automatically generating the resource tags comprises:
   analyzing the computing resources to determine characteristics of the computing resources; and
   tagging the computing resources based at least in part on the determined characteristics of the computing resources.

27. The method of claim 19, wherein automatically generating the resource tags is based at least in part on logical conditions specified by the customers.

28. The method of claim 19, wherein automatically generating the resource tags is performed upon creation of individual computing resources based at least in part on logical conditions specified by the customers.

\* \* \* \* \*